United States Patent [19]

Hodgson et al.

[11] 4,278,531

[45] Jul. 14, 1981

[54] APPARATUS AND METHOD FOR TRANSPORTING ITEMS

[75] Inventors: Thomas D. Hodgson; Tony W. J. Jordan, both of Abingdon, England

[73] Assignee: United Kingdom Atomic Energy Authority, London, England

[21] Appl. No.: 64,910

[22] Filed: Aug. 8, 1979

[30] Foreign Application Priority Data

Aug. 9, 1978 [GB] United Kingdom ............... 32746/78

[51] Int. Cl.³ .............................................. B07B 1/00
[52] U.S. Cl. ...................................... 209/11; 209/250
[58] Field of Search ................... 209/11, 17, 155–161, 209/250; 137/546, 550

[56] References Cited

U.S. PATENT DOCUMENTS

| 368,033 | 8/1887 | Wall ..................................... | 209/157 |
|---|---|---|---|
| 1,035,864 | 8/1912 | Dallemagne ......................... | 209/157 |
| 1,865,167 | 6/1932 | Bongera ............................... | 209/17 X |
| 2,163,927 | 6/1939 | Wright ................................. | 209/17 X |
| 3,195,984 | 7/1965 | Sands ................................... | 23/267 |

FOREIGN PATENT DOCUMENTS

| 773421 | 4/1957 | United Kingdom . |
|---|---|---|
| 821795 | 10/1959 | United Kingdom . |
| 884056 | 12/1961 | United Kingdom . |
| 971188 | 9/1964 | United Kingdom . |
| 1506416 | 4/1978 | United Kingdom . |

*Primary Examiner*—William A. Cuchlinski, Jr.
*Attorney, Agent, or Firm*—Larson, Taylor and Hinds

[57] ABSTRACT

A method and an apparatus for transporting items such as chopped nuclear fuel pins from a receiving station to a discharge station. The apparatus contains a liquid for transporting the items in an inlet duct which extends downwardly from the receiving station to a region where it is joined to an outlet duct which extends upwardly to the discharge station.

The region is connected to a source capable of applying a pressure pulse to the liquid so as to displace the liquid upwardly in at least the outlet duct and thereby transport the items through the apparatus.

At least two apparatus may be connected together in series relationship to provide a plant for the transport of the items through the plant.

13 Claims, 1 Drawing Figure

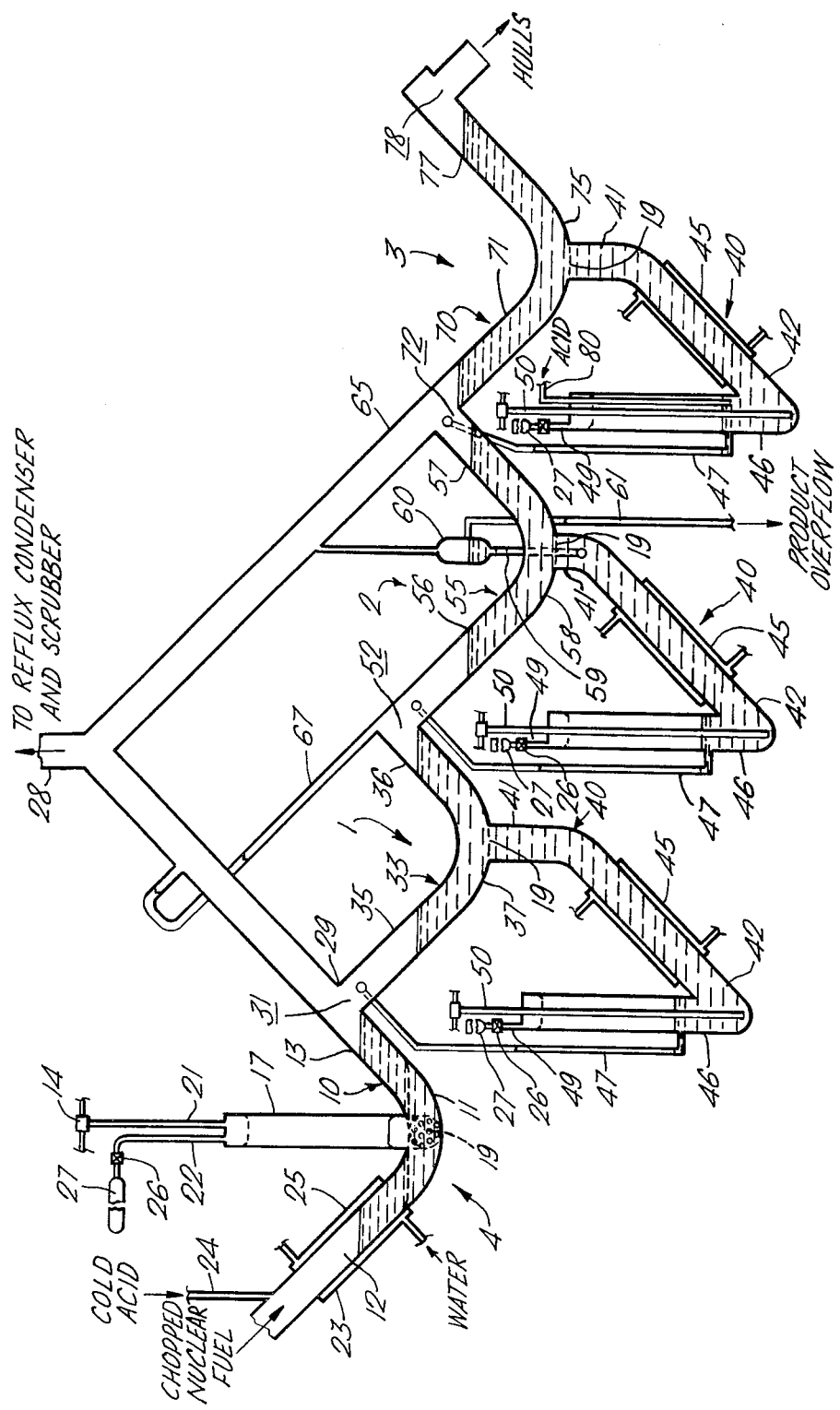

APPARATUS AND METHOD FOR TRANSPORTING ITEMS

This invention relates to a method and to an apparatus for transporting discrete items from one station to another in a continuous or batch process.

In particular, the method and the apparatus of the present invention are useful for transporting chopped pieces of nuclear fuel pins through an acid solvent, such as boiling nitric acid, in which nuclear fuel material and fission products are leached-out of the chopped fuel pins.

In many processes there is a need for a method and an apparatus for transporting items remotely with the minimum of moving parts.

An object of the present invention is thus to provide a method and an apparatus for transporting items remotely in which the number of moving mechanical parts are kept as low as possible.

According to one aspect of the present invention, there is provided an apparatus for transporting from a receiving station to a discharge station items capable of being transported in a liquid, the apparatus comprising an inlet duct for receiving the items to be transported and downwardly extending from the receiving station, an outlet duct connected to the inlet duct at a region below the level of the receiving station and upwardly extending to the discharge station, the inlet duct and the outlet duct being adapted to contain a transporting liquid, displacing means for displacing the transporting liquid upwardly in at least the outlet duct, and a discharge opening at the discharge station, through which discharge opening the items transported by the liquid displaced in the outlet duct can pass.

According to another aspect, the invention provides a method of transporting from a receiving station to a discharge station items capable of being transported in a liquid, the method comprising containing the liquid in a duct having two upwardly extending portions thereof, feeding the items from a receiving station into the liquid in one of the duct portions, displacing the liquid upwardly in at least the other duct portion, and discharging the items from the other duct portion through a discharge opening at the discharge station.

The receiving station may be above or below the level of the discharge opening, and the rate of feed of the items may inhibit upward displacement of the items towards the receiving station.

Overflow means may be provided for limiting the level of the transporting liquid to a level below the level of the discharge opening.

Preferably, at the region a permeable barrier means is provided for fine particulate material to pass therethrough. Desirably, a sump duct downwardly extends from the barrier means, and means are provided for heating or cooling the liquid in the sump duct. At least two said apparatus may be connected together in series relationship for the transport of the items therethrough.

The transporting liquid may be a process liquor for the treatment of the items passing through the apparatus from the receiving station to the discharge station. For example, if the items are chopped nuclear fuel pins the process liquor may be an acid for dissolving out the nuclear fuel materials and fission products from the hulls (chopped pieces of fuel cans). In those instances where the product of the treatment process collects in the process liquor, for example, as a desired useful intermediate of final material, or a contaminant to be removed from the items to be treated, means may be provided to collect the product.

Preferably, some fresh process liquor is caused to flow in the opposite direction to the direction of movement of the items from the receiving station to the discharge station, the remaining fresh process liquor flowing in said direction of movement.

The invention will now be further described, by way of example only with reference to the accompanying drawing which shows a multi-stage acid dissolving plant for use in reprocessing spent nuclear fuel.

Referring now to the drawing, the plant shown comprises three Stages 1, 2 and 3 respectively, and an entry Stage 4. The entry Stage 4 comprises a 'V'-shaped duct 10 having a curved base duct 11, an inlet duct 12, and an outlet duct 13. The inlet duct 12 is connected to a dismantling installation (not shown) in which irradiated nuclear fuel pins are dismantled and chopped into short lengths. A side duct 17 is joined to a fluid permeable barrier 19 at one side of the base duct 11, and has an outlet 21 connected to an ejector 14, and an inlet 22 connected to a compressed air bottle 27 having a control valve 26. A water jacket 23 is fitted around the inlet duct 12 which has an inlet 24 for cold dilute nitric acid 25. The outlet duct 13 extends to a vent duct 28 which is connected to a reflux condenser (not shown) and a chemical scrubber (not shown), and at an intermediate region 29 has a discharge opening 31 into Stage 1 of the plant but at a lower level than the uppermost end of the inlet duct 12. Stage 1 comprises a V-shaped duct 33 containing nitric acid 25 and having an inlet duct 35, an outlet duct 36, and a curved base duct 37 in a lower position than that of the base duct 11. A sump duct assembly 40 depends from a fluid permeable barrier 19 at the underside of the base duct 37, and has a short portion 41 extending normal to the base duct 37 and an inclined portion 42 having a jacket 45 for a heating or a cooling fluid therearound. An upright portion 46 of the sump duct 40 has a transfer duct 47 connected to the inlet duct 35 near the discharge opening 31, and at its upper end has a port 49 connected to a compressed air bottle 27 having a control valve 26, and an ejector 50 which extends down to the bottom of the upright portion 46.

The outlet duct 36 has a discharge opening 52 below the level of the discharge opening 31 and is arranged to spill into Stage 2 which is provided by a 'V'-shaped duct 55 containing nitric acid 25 and having an inlet duct 56, an outlet duct 57, and a curved base duct 58 in a lower position than that of the base duct 37. A sump duct assembly 40 identical to the sump duct assembly 40 of Stage 1 depends from a fluid permeable barrier 19 at the underside of the base duct 58, and a product liquor overflow duct 59 having a chamber 60 therein and an overflow 61 below the level of a discharge opening 72 into Stage 3 extends from the sump duct 40 to a vent duct 65 which extends upwardly from Stage 3 to the vent duct 28. A vent 67 extends from the inlet duct 56 to the inlet duct 13 above the discharge opening 31.

Stage 3 comprises a 'V'-shaped duct 70 containing nitric acid 25 and having an inlet duct 71 connected to the discharge opening 72 which is below the level of the discharge opening 52, and to the vent duct 65. A curved base duct 75 which is slightly lower in position than that of the base duct 58, is joined at one end to the inlet duct 71 and at the other end thereof to an outlet duct 77 which has a discharge opening 78 at a level slightly above that of the discharge opening 72.

A sump duct assembly 40 identical to the sump duct assemblies 40 of Stage 1 and Stage 2 depends from a fluid permeable barrier 19 at the underside of the base duct 75 but additionally has a feed duct 80 for cold nitric acid 25 at the upright portion 46, and the transfer duct 47 thereof is arranged to discharge at the upper end of the outlet duct 57.

In operation, nitric acid 25 is introduced into the plant to the levels shown. Items in the form of a quantity of chopped pieces of nuclear fuel pins, typically 25 mm long and 6.0 mm diameter and comprising irradiated mixed oxide nuclear fuel ($UO_2/PuO_2$) in stainless steel hulls are received in the inlet duct 12 of the entry Stage 4 from the dismantling installation. The side duct 17 is evacuated by means of the ejector 14 connected to the outlet 21, and subsequently a pulse of compressed air at about 0.2 Newtons/$mm^2$ (30 lbs/$in^2$) is applied to inlet 22 to displace the acid 25 and the hulls therein upwardly in the duct 10, causing some of the acid 25 and the hulls to spill over through the discharge opening 31 into the inlet duct 35 of Stage 1.

In Stage 1, a pulse of compressed air at the aforementioned pressure is applied from the bottle 27 to the port 49 to displace the acid 25 in the sump duct assembly 40 and in the 'V'-shaped duct 33 together with the hulls therein, causing some of the acid 25 and the hulls to spill over through the discharge opening 52 into the inlet duct 56 of Stage 2.

In Stage 2, a pulse of compressed air at the aforementioned pressure is applied from the bottle 27 to the port 49 to displace the acid 25 and the hulls in Stage 2 in a similar manner to that described in relation to Stage 1 but as the height of the overflow 61 is below that of the discharge opening 72 less acid 25 is carried over into the inlet duct 71 of Stage 3, hulls being pushed and remaining out of the acid 25 during a pulse cycle in the outlet duct 57, and product liquor flowing from overflow 61.

In Stage 3, a pulse of compressed air from the bottle 27 at the aforementioned pressure is applied to the port 49 to displace the acid 25, and the hulls in the 'V'-shaped duct 70, in a similar manner to that described in relation to Stages 1 and 2, causing the hulls and some of the acid 25 to be discharged through the discharge opening 78. As the discharge opening 78 is slightly above the level of the discharge opening 72, less acid 25 is discharged than during a pressure pulse in Stage 1 but more than during a corresponding pressure pulse in Stage 2. The empty hulls discharged from the outlet duct 77 may be washed or treated in one or more additional Stages (not shown).

The effect of the upward displacement of the acid 25 in each Stage 1, 2, 3 is to fluidise the hulls in the respective outlet duct 36, 57 or 77, thus causing preferential upward displacement of these hulls at the expense of those in the respective inlet ducts 35, 56, or 71. Fines in the form of nuclear fuel material and fission products not dissolved in the 'V'-shaped ducts 33, 55 and 70, fall through the permeable barriers 19 into the respective sump duct assemblies 40 in which the agitation produced by the pulsing of the acid 25 assists in the dissolution of the fines. Eventually insoluble fines collect at the bottom of the sump duct assemblies 40 and are removed periodically by use of the respective ejectors 50. The application of the pulse of compressed air is repeated at each Stage 1, 2, 3 and entry Stage 4 at between two to three minute intervals.

To replace acid 25 discharged through the discharge opening 72, and product liquor flowing from the overflow 61, fresh acid 25 is fed into the feed duct 80 of Stage 3 and the inlet 24 of the entry Stage 4 so that fresh acid can flow in the direction of movement of the hulls and in the opposite direction through the plant. Some acid 25 is circulated from the sump duct assemblies 40 through the transfer ducts 47 to the respective 'V'-shaped ducts 33 or 55.

The temperature of the acid 25 in each Stage 1, 2, 3, and entry Stage 4 is controlled by the respective jacket 23, or 45 by adjusting the temperature of the fluid circulating through the respective jacket 23, 45, so that the nitric acid in the entry Stage 4 and Stage 3 is close to ambient temperature and the nitric acid in Stages 1 and 2 is just below its boiling temperature. Product gases are vented to the vent duct 28 for reflux condensation and chemical scrubbing.

The fluid permeable barriers 19 may conveniently be provided by perforating the respective base duct 11, 37, 58 or 75.

Although the invention has been described in relation to a plant having three Stages, a single Stage may be used, or any convenient multiple Stage arrangement used to suit a particular application. Each Stage may have the liquid therein displaced upwardly in a sequential manner by suitable sequential timing of the application of the compressed air pulses to the liquid to transport the items from one Stage to another.

The plant is arranged to be dimensioned so that in the event of complete failure there will not be a critical mass of nuclear fissionable material retained in the plant, and furthermore, the plant will be housed within a biological shield. The plant may be constructed where appropriate from stainless steel or from a suitable glass.

It will be understood that, if desired, a sump duct assembly 40 could be joined to a permeable barrier means 19 at the side of the base duct 37 instead of to the underside of the base duct 37.

Superheated steam could be used to provide the pressure pulse to displace the acid 25, or a hydraulic ram or piston used to produce a similar effect.

The apparatus of the invention is not restricted to the dissolution of nuclear fuel materials, and may also be designed to transport items with, or without the transporting liquid reacting or treating the items to be transported.

The inlet duct and the outlet duct could be joined together in an alternative arrangement to that described above, and need not be straight, for example they could be coiled helically upwards. The use of a curved join between the inlet duct and the outlet duct is preferred, however, to inhibit any tendency of the items to jam. The inlet duct and the outlet duct could be formed by a tank with a downwardly extending dividing wall or baffle that terminates above the bottom of the tank to form essentially an inlet passageway and an outlet passageway.

We claim:

1. Apparatus for transporting from a receiving station to a discharge station items capable of being transported in a liquid, the apparatus comprising,
    (a) an inlet duct for receiving items, the inlet duct having at the upper end thereof a receiving station and extending downwardly therefrom;
    (b) an outlet duct connected at one end thereof to the inlet duct at a region thereof below the receiving station, the outlet duct having a discharge station at the upper end of said outlet duct and extending upwardly from the region to the discharge station;

(c) port means at the region and comprising a permeable barrier means for fine particulate material from the items to pass therethrough at the lower portion of the region;

(d) duct means extending at one end thereof from said region at said port means;

(e) means connectable to the other end of the duct means for applying pressure pulses to a liquid in the apparatus as to displace the liquid in the inlet duct and the outlet duct upwardly and thereby transport the items through the apparatus to the discharge station.

2. A multi-stage plant for transporting from a first receiving station at said plant to a last discharge station at said plant items capable of being transported in a liquid, the plant comprising a plurality of apparatuses connected in series relationship from the first receiving station to the last discharge station, each apparatus comprising, (a) an inlet duct for receiving items and having a one end thereof a receiving station and extending downwardly therefrom;

(b) an outlet duct connected at one end thereof to the inlet duct at a region of the inlet duct below said receiving station, the outlet duct having a discharge station at the other end of said outlet duct and extending upwardly from the region to said discharge station;

(c) port means at the region and comprising a permeable barrier means for fine particulate material from the items to pass therethrough at the lower portion of the region;

(d) duct means extending at one end thereof from said region at the port means;

(e) means connectable to the other end of the duct means for applying a pressure pulse to a liquid in the apparatus so as to displace the liquid in the inlet duct and the outlet duct upwardly and thereby to transport the items through the apparatus to the said discharge station;

the apparatuses being connected in series relationship so that the discharge station of a said apparatus is connected to the receiving station of an adjacent said apparatus from the first of the said receiving stations to the last of the said discharge stations.

3. A plant as claimed in claim 2, wherein successive regions are at a lower level than the level of the immediately preceding region.

4. A method of transporting from a first receiving station to a last discharge station items capable of being transported in a liquid, the method comprising, (a) containing a liquid in a plurality of ducts, each duct having two portions thereof upwardly extending from a lower region of the duct, said lower regions having thereat a barrier permeable to fine particulate material from the items, and one of the portions having a receiving station at the upper end thereof and the other portion having a discharge station at the upper end thereof, the ducts being connected together in series relationship so that the first duct in the series provides the first receiving station and the last duct in the series provides the last discharge station;

(b) feeding the items into the first receiving station;

(c) intermittently displacing the liquid upwardly in the other portions of the ducts by sequentially applying pressure pulses to the liquid therein so as to displace said items through the discharge openings of the respective ducts whereby the items are sequentially transported through the plant from the first receiving station to the last discharge station and fine particulate material from the items passes through the permeable barriers.

5. Apparatus for transporting from a receiving station to a discharge station items capable of being transported in a liquid, the apparatus comprising, (a) an inlet duct for receiving items, the inlet duct having at the upper end thereof a receiving station and extending downwardly therefrom;

(b) an outlet duct connected at one end thereof to the inlet duct at a region thereof below the receiving station, the outlet duct having a discharge station at the upper end of said outlet duct and extending upwardly from the region to the discharge station;

(c) port means at the region and comprising a permeable barrier means for fine particulate material from the items to pass therethrough at the lower portion of said region;

(d) duct means depending at one end thereof from the region at the port means;

(e) means connectable to the other end of the duct means for applying a pressure pulse to a liquid in the apparatus so as to displace the liquid in the inlet duct and the outlet duct upwardly and thereby transport the items through the apparatus to the discharge station.

6. Apparatus as claimed in claim 5, including overflow means having an inlet connected to the duct means, and an outlet at a height such as to limit the level of the liquid in the outlet duct.

7. Apparatus as claimed in claim 5, including means at a portion of the duct means for controlling the temperature of the liquid in the duct means.

8. Apparatus for transporting from a receiving station to a discharge station items capable of being transported in a liquid, the apparatus comprising, (a) an inlet duct for receiving items, the inlet duct having at the upper end thereof a receiving station and extending downwardly therefrom;

(b) an outlet duct connected at one end thereof to the inlet duct at a region thereof below the receiving station, the outlet duct having a discharge station at the upper end of said outlet duct and extending upwardly from the region to the discharge station, said discharge station being at a higher level than that of the receiving station;

(c) port means at said region;

(d) duct means extending at one end thereof from the region at the port means;

(e) means connectable to the other end of the duct means for applying a pressure pulse to a liquid in the apparatus so as to displace the liquid in the inlet duct and the outlet duct upwardly and thereby transport the items through the apparatus to the discharge station.

9. A multi-state plant for transporting from a first receiving station at said plant to a last discharge station at said plant items capable of being transported in a liquid, the plant comprising a plurality of apparatuses connected in series relationship from the first receiving station to the last discharge station, each apparatus comprising, (a) an inlet duct for receiving items and having at one ed thereof a receiving station and extending downwardly therefrom;

(b) an outlet duct connected at one end thereof to the inlet duct at a region of the inlet duct below said receiving station, the outlet duct having a discharge station at the other end of said outlet duct and extending upwardly from said region to said discharge station;

(c) port means at the region;

(d) duct means extending at one end thereof from the region at the port means;

(e) means connectable to the other end of the duct means for applying a pressure pulse to a liquid in the apparatus so as to displace the liquid in the inlet duct and the outlet duct upwardly and thereby to transport the items through the apparatus to the said discharge station;

the apparatuses being connected in series relationship so that the discharge station of a said apparatus is connected to the receiving station of an adjacent said apparatus from the first of the said receiving stations to the last of the said discharge stations, at least one of the discharge stations being at a higher level than the immediately preceding receiving station, the other discharge stations being at a lower level than the respective immediately preceding receiving stations.

10. A multi-stage plant for transporting from a first receiving station at said plant to a last discharge station at said plant items capable of being transported in a liquid, the plant comprising a plurality of apparatuses connected in series relationship from the first receiving station to the last discharge station, each apparatus comprising, (a) an inlet duct for receiving items and having at one end thereof a receiving station and extending downwardly therefrom;

(b) an outlet duct connected at one end thereof to the inlet duct at a region of the inlet duct below said receiving station, the outlet duct having a discharge station at the other end of said outlet duct and extending upwardly from the region to said discharge station;

(c) port means at the region;

(d) duct means extending at one end thereof from the region at the port means;

(e) means connectable to the other end of the duct means for applying a pressure pulse to a liquid in the apparatus so as to displace the liquid in the inlet duct and the outlet duct upwardly and thereby to transport the items through the apparatus to the said discharge station;

the apparatuses being connected in series relationship so that the discharge station of a said apparatus is connected to the receiving station of an adjacent said apparatus from the first of the said receiving stations to the last of the said discharge stations; and an overflow means having an inlet connected to the duct means of at least one said apparatus and an outlet at a level such as to limit the level of the liquid in the outlet duct of said one apparatus.

11. A multi-stage plant for transporting from a first receiving station at said plant to a last discharge station at said plant items capable of being transported in a liquid, the plant comprising a plurality of apparatuses connected in series relationship from the first receiving station to the last discharge station, each apparatus comprising, (a) an inlet duct for receiving items and having at one end thereof a receiving station and exteding downwardly therefrom;

(b) an outlet duct connected at one end thereof to the inlet duct at a region of the inlet duct below said receiving station, the outlet duct having a discharge station at the other end of said outlet duct and extending upwardly from the region to said discharge station;

(c) port means at the region, the port means of at least some of the apparatuses comprising a permeable barrier means for fine particulate material from the items to pass therethrough at the lower portion of the region;

(d) duct means extending at one end thereof from the region at the port means, the respective duct means depending from those regions having permeable barrier means thereat;

(e) means connectable to the other end of the duct means for applying a pressure pulse to a liquid in the apparatus so as to displace the liquid in the inlet duct and the outlet duct upwardly and thereby to transport the items through the apparatus to the said discharge station;

the apparatuses being connected in series relationship so that the discharge station of a said apparatus is connected to the receiving station of an adjacent said apparatus from the first of the said receiving stations to the last of the said discharge stations.

12. A plant as claimed in claim 11, including a jacket for the circulation of a fluid therethrough around at least a portion of the duct means, so as to adjust the temperature of the liquid in the duct means from the temperature of the fluid.

13. A plant as claimed in claim 11, wherein said respective duct means includes a downwardly inclined portion thereof connected at the lower end thereof to a substantially upright portion of the duct means, and a conduit is connected at one end to the upright portion and at the other end thereof to the inlet duct of the respective apparatus so as to transfer some of the liquid from the upright portion to the said inlet duct during a said pressure pulse.

* * * * *